(12) United States Patent
Aliakseyeu et al.

(10) Patent No.: US 10,306,737 B2
(45) Date of Patent: May 28, 2019

(54) METHOD FOR CONFIGURING A DEVICE IN A LIGHTING SYSTEM

(71) Applicant: SIGNIFY HOLDING B.V., Eindhoven (NL)

(72) Inventors: Dzmitry Viktorovich Aliakseyeu, Eindhoven (NL); Antonie Leonardus Johannes Kamp, Eindhoven (NL); Philip Steven Newton, Eindhoven (NL); Leendert Teunis Rozendaal, Eindhoven (NL); Sanae Chraibi, Eindhoven (NL); Bartel Marinus Van De Sluis, Eindhoven (NL); Dirk Valentinus Rene Engelen, Eindhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/741,379

(22) PCT Filed: Jul. 8, 2016

(86) PCT No.: PCT/EP2016/066297
§ 371 (c)(1),
(2) Date: Jan. 2, 2018

(87) PCT Pub. No.: WO2017/009234
PCT Pub. Date: Jan. 19, 2017

(65) Prior Publication Data
US 2018/0206312 A1 Jul. 19, 2018

(30) Foreign Application Priority Data
Jul. 14, 2015 (EP) ..................................... 15176683

(51) Int. Cl.
*H05B 37/02* (2006.01)
*H05B 33/08* (2006.01)

(52) U.S. Cl.
CPC ..... *H05B 37/0245* (2013.01); *H05B 33/0845* (2013.01); *H05B 33/0863* (2013.01); *H05B 37/0227* (2013.01)

(58) Field of Classification Search
CPC ............ H05B 33/0855; H05B 33/0848; H05B 33/0896; H05B 33/0863; H05B 33/0872;
(Continued)

(56) References Cited

U.S. PATENT DOCUMENTS

2004/0215566 A1* 10/2004 Meurer ................... G06Q 10/10
                                                                    705/43
2006/0178204 A1*  8/2006 Okada ................ G07F 17/3211
                                                                    463/20
(Continued)

FOREIGN PATENT DOCUMENTS

WO    2007072314 A1    6/2007
WO    2013186665 A2   12/2013

*Primary Examiner* — Douglas W Owens
*Assistant Examiner* — Syed M Kaiser

(57) ABSTRACT

A configuration system (100) for configuring a first device (130) in a lighting system is disclosed. The configuration system (100) comprises a memory (102) arranged for storing one or more light settings (110), which light settings (110) are defined by one or more light setting rules (112). The configuration system (100) further comprises a communication unit (104) arranged for communicating with the first device (130). The configuration system (100) further comprises a processor (106) arranged for identifying a device property (132) of the first device (130) based on information received from the first device (130) via the communication unit (104). The processor (106) is further arranged for accessing one or more light settings (110) stored in the memory (102), and for associating the device property (132)
(Continued)

with at least one of the one or more light setting rules (112) of at least one of the one or more light settings (110) only if the device property (132) is compliant with the respective light setting rule (112), and for storing the association. This method allows a user to connect the first device (130) to the configuration system (100), whereupon the configuration system (100) determines the functionality of the first device (130) in the lighting system based on the light settings (110) stored in the memory (102).

15 Claims, 4 Drawing Sheets

(58) Field of Classification Search
CPC ............ H05B 37/0227; H05B 37/0245; H05B 33/0887
USPC ........................................................ 315/152
See application file for complete search history.

(56) References Cited

U.S. PATENT DOCUMENTS

| | | |
|---|---|---|
| 2006/0202851 A1 | 9/2006 | Cash et al. |
| 2009/0230894 A1 | 9/2009 | De Goederen et al. |
| 2010/0185339 A1 | 7/2010 | Huizenga et al. |
| 2010/0241255 A1 | 9/2010 | Benetz et al. |
| 2011/0018465 A1* | 1/2011 | Ashdown ............ H05B 33/0818 315/294 |
| 2011/0193484 A1* | 8/2011 | Harbers ............. H05B 33/0803 315/129 |
| 2012/0007553 A1* | 1/2012 | Ichikawa ............ B60L 11/1816 320/109 |
| 2012/0085291 A1* | 4/2012 | Conger ................. A01K 1/0047 119/419 |
| 2012/0280625 A1* | 11/2012 | Zampini, II ....... H05B 33/0872 315/151 |
| 2014/0062340 A1* | 3/2014 | Elgayyar ............ H05B 37/0245 315/360 |
| 2014/0070706 A1 | 3/2014 | Fushimi |
| 2014/0266600 A1 | 9/2014 | Alberth et al. |
| 2014/0354161 A1* | 12/2014 | Aggarwal .......... H05B 37/0245 315/153 |
| 2015/0008828 A1 | 1/2015 | Carrigan et al. |
| 2015/0168255 A1* | 6/2015 | Hamilton .............. G01M 13/04 73/593 |
| 2015/0189724 A1 | 7/2015 | Karc et al. |
| 2017/0295624 A1* | 10/2017 | Lark, Jr. ................ G01R 31/44 |
| 2017/0295631 A1* | 10/2017 | Lark, Jr. ............ H05B 37/0272 |

\* cited by examiner

METHOD FOR CONFIGURING A DEVICE IN A LIGHTING SYSTEM

CROSS-REFERENCE TO PRIOR APPLICATIONS

This application is the U.S. National Phase application under 35 U.S.C. § 371 of International Application No. PCT/EP2016/066297, filed on Jul. 8, 2016 which claims the benefit of European Patent Application No. 15176683.9, filed on Jul. 14, 2015. These applications are hereby incorporated by reference herein.

FIELD OF THE INVENTION

The invention relates to a method for configuring a first device in a lighting system and a configuration system for configuring the first device in the lighting system. The invention further relates to a computer program product for performing the method.

BACKGROUND

Future and current home and professional environments will contain a large number of lighting devices for creation of ambient, atmosphere, accent or task lighting. These controllable lighting devices (lamps) may be connected via a (wireless) network, and be controlled by control devices such as smart phones, tablet pcs, sensors and/or (smart) light switches. A problem that arises when a lighting system comprises multiple lighting devices and control devices, is that each device needs to be configured in order to communicate accordingly with the other devices. Furthermore, when a new device is added to a fully configured lighting system, the new device needs to be configured in order to communicate accordingly with the already configured devices. Patent application US2010185339A1 discloses a method of provisioning of wireless (lighting) control devices by requesting the location and the specifications of the (lighting) control devices. A (lighting) scene is assigned to each control device based on its location and its specification.

SUMMARY OF THE INVENTION

It is an object of the present invention to provide an improved way of configuring a device in a lighting system.

According to a first aspect of the present invention the object is achieved by a method for configuring a first device in a lighting system, the method comprising the steps of:
  accessing one or more light settings stored in a memory, which light settings are defined by one or more light setting rules,
  connecting the first device to the lighting system,
  identifying a device property of the first device,
  associating the device property of the first device with at least one of the one or more light setting rules of at least one of the one or more light settings only if the device property is compliant with the respective light setting rule, thereby associating the first device with the light setting, and
  storing the association.

This method allows a user to connect the first device to the lighting system, whereupon the lighting system determines the functionality of the first device based on the light settings stored in the memory. This provides the advantage that the user no longer needs to go through the process of (manually) configuring the functionality of the first device. This further removes the need to couple a first device with a second device or to group a plurality of devices. Another advantage of this method is that a first device may be associated with a plurality of light settings.

In the context of the present invention, the term "compliant" is used to indicate that the device property is in accordance with the light setting rule. For example, when a light setting rule requires a lighting device able to emit colored light, a lighting device with a light source arranged to emit colored light (i.e. the device property) is compliant with the light setting rule, whereas a lighting device with a light source not arranged to emit colored light (e.g. a light source for emitting white light) is not compliant with the light setting rule.

In an embodiment of the method, the first device is a control device for controlling the lighting system in dependence of an input, which control device comprises an input element arranged for receiving the input, and the device property is defined by a type of the input element. The first device may, for example, be a light switch, a dimmer switch, a sensor, a smart device, etc. arranged for controlling a light output of a lighting device. The control device may be arranged for generating a control signal, for example a sensor signal, an on/off signal, a dimmer signal, etc., which may effectuate a light setting of a lighting device upon receiving the input. A user may trigger the generation of the control signal by providing a user input via the input element. The input element may be, for example, a switch element of a light switch, a rotary element of a dimmer switch, a detection element of the sensor (e.g. an occupancy sensor) or a touch screen of a remote control device.

In an embodiment of the method, the first device is a lighting device arranged for emitting light, and the device property is defined by a type of the lighting device. In this embodiment, the lighting device comprises at least one light source arranged for emitting light. The lighting device may be arranged for receiving a control signal (for example generated by a control device such as a light switch), which may be an on/off signal, a dim signal, a light setting signal, etc.

The two preceding embodiments illustrate that the method may enable configuration of a first device that is able to generate a control signal and configuration of a first device that is able to receive a control signal. This provides the advantage that the method enables connecting two first devices (e.g. a light switch and a lamp) by associating device properties of both first devices to one or more light setting rules of a light setting.

In an embodiment of the method, the lighting system comprises a second device which is associated with a first light setting, and the association between the device property of the first device and the at least one light setting rule is further based on the association between the first light setting and the second device. This embodiment is advantageous because it allows the lighting system to make the association based on the configuration of the second device(s). This allows the lighting system, for example, to copy the configuration setting/functionality of the second device to the first device, or to complement the configuration setting/functionality of the second device by associating the first device to a specific light setting.

In an additional embodiment of the method, the method further comprises the step of receiving an indication of a proximity between the first device and the second device, and the association of the device property of the first device with the at least one of the one or more light setting rules is further based on the indication of the proximity. In an alternative embodiment, the method further comprises the step of receiving a first indication of a first location of the first device and a second indication of a second location of the second device, and the association of the device property with the at least one of the one or more light setting rules is further based on the locations of the first device and the second device. These embodiments provide the benefit that they enable the lighting system to determine the association between the device property of the first device and a light setting rule based on the distance between the first device and the second device. This allows the lighting system, for example, to associate the device property of the first device with a light setting rule of a light setting already associated with a nearby second device.

In an embodiment of the method, the method further comprises the step of accessing a usage history of the one or more light settings, and the association of the device property with the at least one of the one or more light setting rules is further based on the usage history of the one or more light settings. The association between the light setting rule and the device property may be further based on the usage frequency of the corresponding light setting. This may be beneficial because it may allow the lighting system to, for example, only associate often-used light settings with the first device, or to associate rarely used light settings in order to provide a surprising effect for the user.

In an embodiment of the method, the method further comprises the step of assigning a priority to one or more light settings and/or one or more light setting rules, and the association of the device property with the at least one of the one or more light setting rules is further based on the priority of the one or more light settings and/or the one or more light setting rules. The priority may be based on, for example, the usage history, safety regulations, user/system preference settings, default settings, etc. This may be advantageous because it allows the lighting system to determine which light setting rule to associate with the device property of the first device, not only based on the compliance, but also based on the priority.

According to a second aspect of the present invention the object is achieved by a computer program product for a computing device, the computer program product comprising computer program code to perform the method according to any one of the above-mentioned methods when the computer program product is run on a processing unit of the computing device.

According to a third aspect of the present invention the object is achieved by a configuration system for configuring a first device in a lighting system, the configuration system comprising:
  a memory arranged for storing one or more light settings, which light settings are defined by one or more light setting rules,
  a communication unit arranged for communicating with the first device for receiving information about a device property of the first device, and
  a processor coupled to the communication unit arranged for identifying the device property of the first device, and for accessing one or more light settings stored in the memory, and for associating the device property with at least one of the one or more light setting rules of at least one of the one or more light settings only if the device property is compliant with the respective light setting rule, and for storing the association.

The processor is arranged for identifying the device property of the first device based on information received via the communication unit. The information may comprise, for example, a type of first device, an identifier of the first device, type(s) of control signal(s) that can be generated/received by the first device, etc. The configuration system configures the first device by associating the device property with at least one light setting rule of a light setting. The first device (e.g. a light switch) may then communicate with a second device (e.g. a lamp) via the lighting system, via an intermediate communication device and/or directly with the second device. This may require that the communication unit of the configuration system communicates the association with the light setting—and therefore the association with the second device—to the lighting system, the intermediate communication device and/or the first device.

In an embodiment of the configuration system, the memory is further arranged for storing a usage history of one or more light settings, and the processor is further arranged for accessing the usage history of the one or more light settings, and for associating the device property with the at least one light setting rule further based on the usage history of the one or more light settings. This provides a further parameter for the association, providing the processor with further information to determine the association(s).

In an embodiment of the configuration system, the configuration system further comprises a proximity detector arranged for detecting a proximity of the first device, and the processor is further arranged for associating the device property with the at least one light setting rule further based on the detected proximity. The proximity information is used to associate a device property of the first device with a light setting rule of a light setting, if the device property and the light setting rule are compliant, and if the first device is, for example, within a predetermined proximity of the proximity detector.

Alternatively, the configuration system further comprises a location detector arranged for detecting a location of the first device, and the processor is further arranged for associating the device property with the at least one light setting rule further based on the detected location. The location information is used to associate a device property of the first device with a light setting, if the device property and the light setting rule are compliant, and if the first device is, for example, at a predetermined location relative to the location detector or relative to a further device. This is advantageous because it allows the configuration system to, for example, associate a device property of the first device with a light setting rule of a light setting that is also associated to a (nearby) further device.

In an embodiment of the configuration system, the processor is further arranged for determining if the first device is arranged for generating control signals or for receiving control signals based on the device property, and for associating the device property with the at least one light setting rule further based on this determination. This embodiment is beneficial because it allows the processor to configure devices arranged for generating control signals (e.g. light switches, light control panels, dimmer switches, rotary switches, sensors, cameras, etc.) and devices arranged for receiving control signals (e.g. LED bulbs, Philips Hue bulbs, LED strips, portable lighting devices, etc.). It further allows the processor to associate a device property of a first device arranged for generating control signals with a light setting rule of a light setting already associated with a device property of a first device arranged for receiving control signals.

In an embodiment of the configuration system, the memory, the communication unit and the processor are co-located in one device. The device may, for example, be a home automation system, a bridge, a hub, a smart device such as a smart phone, etc. The communication device may function as a bridge between a plurality of first devices, or it may establish a direct connection between the plurality of first devices, thereby removing the need for the control signals to pass through the communication device.

In an alternative embodiment of the configuration system, the memory may be located remotely from the communication unit and the processor device. The memory may be located in a further device, in a remote server, in an online server accessible via the internet, etc.

BRIEF DESCRIPTION OF THE DRAWINGS

The above, as well as additional objects, features and advantages of the disclosed method and configuration system, will be better understood through the following illustrative and non-limiting detailed description of embodiments of devices, systems and methods, with reference to the appended drawings, in which.

All the figures are schematic, not necessarily to scale, and generally only show parts which are necessary in order to elucidate the invention, wherein other parts may be omitted or merely suggested.

DETAILED DESCRIPTION OF EMBODIMENTS

Figure 1:
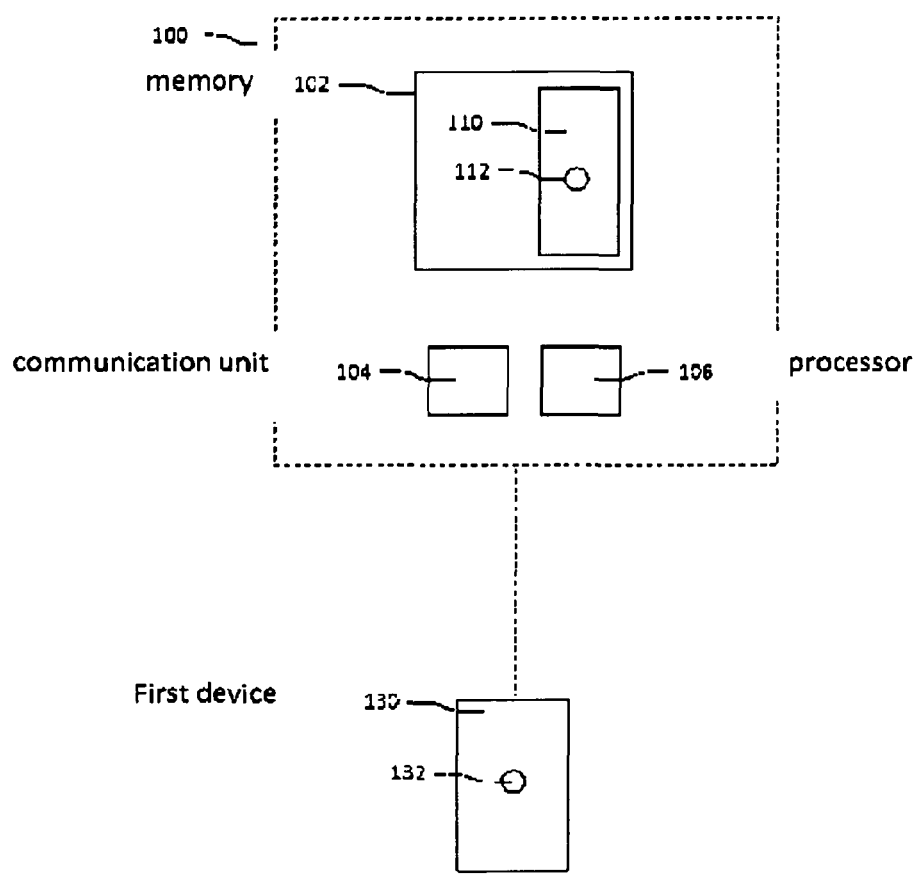
FIG. 1 shows schematically an embodiment of a configuration system according to the invention for configuring a first device in a lighting system.

FIG. 1 shows schematically an embodiment of a configuration system 100 according to the invention for configuring a first device 130 in a lighting system. The configuration system 100 comprises a memory 102 arranged for storing one or more light settings 110, which light settings 110 are defined by one or more light setting rules 112. The memory 102 may for example be arranged as a database 102. The system 100 further comprises a communication unit 104 arranged for communicating with the first device 130 and a processor 106 arranged for identifying a device property 132 of the first device 130 based on information received from the first device 130 via the communication unit 104. The processor 106 is further arranged for accessing one or more light settings 110 stored in the memory 102, and for associating the device property 132 with at least one light setting rule 112 of a light setting 110 if the device property 132 is compliant with the respective light setting rule 112, and for storing the association (for example in the memory 102). The configuration system 100 may be any type of system arranged for communicating with first devices 130 which are arranged for controlling light emitting devices and/or for being controlled by lighting control devices. The components (the processor 106, the communication unit 104, the memory 102 and, optionally, other sensing/detection units) of the configuration system 100 may be comprised in one device, be distributed over a plurality of devices or be part of the lighting system. The configuration system 100 may, for example, be comprised in a hub, a bridge a home/office automation system, the lighting system, a computer, etc., which may be arranged for controlling multiple (smart) devices in the building. Integrating the configuration system 100 in a hub/bridge/home/office automation system may be advantageous in that it may provide an interface platform between first devices 130. Furthermore, a hub/bridge/home/office automation system may already be arranged for communicating with a plurality of devices via a (plurality of) communication protocol(s). Alternatively, the processor 106, the communication unit 104 and/or the memory 102 may be integrated in a smart device such as a smart phone, a smart watch, a tablet pc, a laptop, etc. Integrating the components in a smart device may be beneficial in that it may provide an interface platform between multiple first devices 130. The memory 102 may be located in the smart device or the memory 102 may be located in a further device, such as a remote server which may be accessible via the internet.

The memory 102 of the configuration system 100 is arranged for storing the light settings 110 and the corresponding light setting rules 112. The memory 102 illustrated in FIG. 1 comprises a first light setting 110, and its corresponding light setting rule 112. The light setting rule 112 may be descriptive of the properties of the light setting. The light setting rule 112 may, for example, describe the on/off properties, the number/type of lighting devices associated with the light setting, dimming properties, color properties, color temperature properties, sensor properties (e.g. activation/deactivation of the light setting 110 upon triggering a sensor), time/date properties (light adjustment based on time/date information), dynamic properties (e.g. multiple lighting effects distributed over a plurality of points in time), etc.

The first device 130 illustrated in FIG. 1 comprises a device property 132. The device property 132 may be descriptive of the type control signals (input/output signals or messages) the first device 130 can generate and/or receive. The first device 130 may be a control device (e.g. a light switch, a sensor, an occupancy sensor, a weather sensor, an audio sensor, a dimmer switch, a rotary switch, a touch panel, etc.) arranged for generating control signals. For such a control device examples of device properties 132 are its input characteristics, its communication (protocol) characteristics, its sensing characteristics, etc. Alternatively, the first device 130 may be a controllable (lighting) device (e.g. a lamp, a smart lamp, an LED lamp, an LED strip, an LED matrix, luminous panel, etc.) arranged for receiving control signals. For such a controllable device examples of device properties 132 are its dimming characteristics, its (color) light emission characteristics, its number of light sources, its communication (protocol) characteristics, etc.

The communication unit 104 is arranged for communicating with the first device. The communication unit 104 may be arranged for communicating with the first device 130 via any communication protocol, for example via Bluetooth, Wi-Fi, Zigbee, 3G, 4G, Ethernet, DALI, DMX, power-line communication or any other wired or wireless protocol). A specific communication protocol may be selected based on the communication capabilities of the first device 130 and further devices connected to the configuration system 100, the power consumption of the communication driver for the wireless technology and/or the communication range of the wireless signals. Many consumer devices (such as smart lamps, smart switches, control panels, etc.) may already be equipped with one or more wireless communication technologies, which is advantageous because this may reduce the effort to create a communication link between the first device 130 and the configuration system 100.

The processor 106 is arranged for identifying the device property 132 of the first device, for accessing one or more light settings 110 stored in the memory 102, and for associating the device property 132 with at least one of the one or more light setting rules 112 of a light setting 110 if the device property 132 is compliant with the at least one light setting rule 112. The processor 106 (e.g. a computer processor, a microcontroller, etc.) may store the associations in the memory 102, which may be, for example, co-located with the processor 106 in the same device. This is advantageous in the embodiment wherein the first device 130 communicates with a second device through the lighting system, because it allows the processor 106 to directly access the stored associations. For example, the first device 130 may be a light switch and the second device may be a lamp, which are both configured by the configuration system 100 and connected to the lighting system. In this example, the lighting system may comprise a smart phone or a home automation system storing the associations, receiving control signals from the light switch and transmitting control signals to the lamp. Additionally or alternatively, the processor 106 may store the associations in the memory of a remote device, for example in a remote server accessible via a network (e.g. the Internet). This is advantageous in the embodiment wherein the first device 130 communicates with a second device via the remote device, because no connection between the first device, the second device and the lighting system is required after the configuration of the first and second device. For example, the first device 130 may be a light switch and the second device may be a lamp, which are both configured by the configuration system 100. In this example, the configuration system 100 may be comprised in a smart phone arranged for associating the device property 132 with the light setting rules 112, and storing the associations in a home automation terminal arranged for receiving control signals from the light switch and transmitting control signals to the lamp. Additionally or alternatively, the processor 106 may store the associations in a memory of the first device 130 and/or in a memory of the second device. This is advantageous in the embodiment wherein the first device 130 is directly connected to a second device. For example, the first device 130 may be a light switch and the second device may be a lamp, which are both configured by the configuration system 100, but not controlled via a central lighting system. In this example, the configuration system 100 may be a tablet pc arranged for associating the device property 132 with the light setting rules 112, and storing the associations in a memory of the lamp and/or a memory of the light switch.

The processor 106 may be further arranged for determining if the first device 130 is arranged for generating control signals or for receiving control signals based on the device property 132, and for associating the device property 132 with the at least one light setting rule 112 further based on this determination. This allows the processor 106 to determine if the first device 130 is a controllable device (such as a lamp) or a control device (such as a light switch) and to further determine the association based on the type of device. It may, for example, be desirable that a device property 132 of a controllable device is associated with a plurality of light setting rules 112 or light settings 110 (for example, a lamp may be associated with a disco light setting, a task light setting 110 and an emergency light setting), while a device property 132 of a control device is associated with one or more light setting rules of one light setting 110 only (e.g. a click-on-click-off switch of a lighting control panel may be associated with one setting only, allowing the user to effectuate that light setting 110 upon pressing the click-on-click-off switch). Alternatively, it may be desirable that a control device is associated with light setting rules of a plurality of light settings 110 to fulfill a function, disregarding which associated light setting 110 is active. This may, for example, be useful when a rotary switch is used to dim the light of the light settings 110, allowing the user to dim the light no matter which light setting 110 is currently active.

Figure 2:
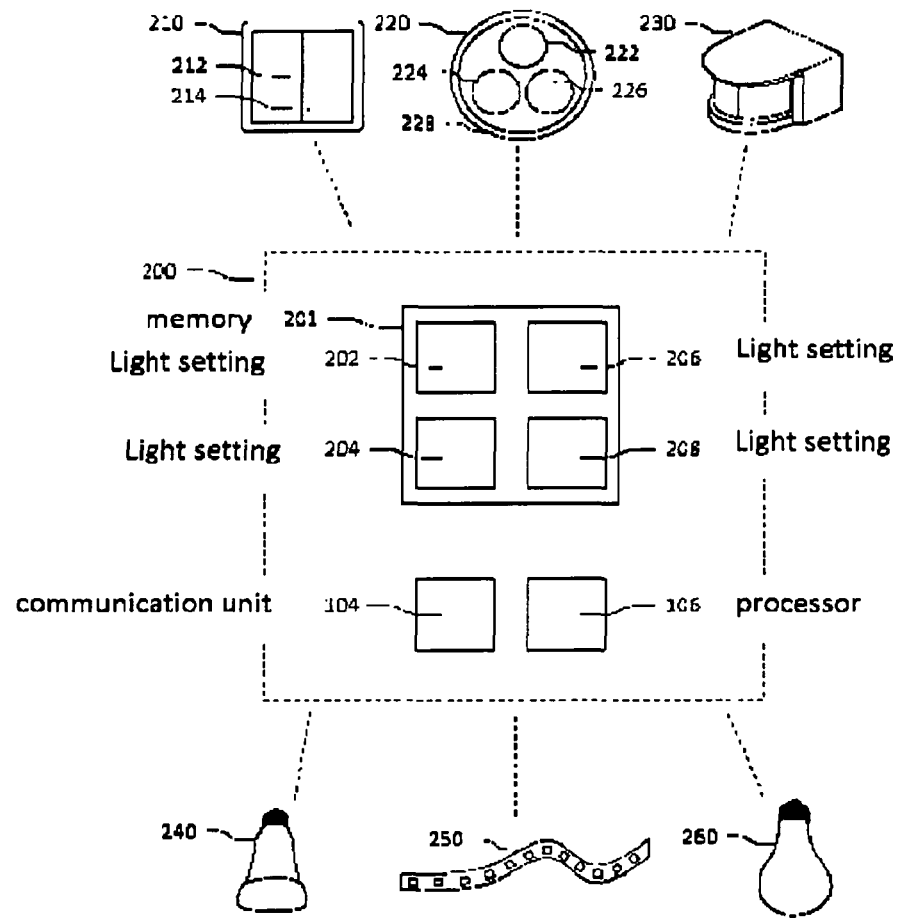
FIG. 2 shows schematically an embodiment of a configuration system according to the invention for configuring a first device in a lighting system and examples of first devices.

FIG. 2 illustrates a plurality of examples of first devices 210, 220, 230, 240, 250, 260 that may be configured by configuration system 200. A memory 201 in FIG. 2 stores four light settings 202, 204, 206, 208, each with its corresponding light setting rules (not shown). To elucidate how the processor 106 may associate the first devices 210, 220, 230, 240, 250, 260 with light settings 202, 204, 206, 208, the next examples illustrate how device properties may be associated with light setting rules. It should be noted that the below-mentioned examples illustrate rather than limit the invention, and that those skilled in the art will be able to design many alternative examples without departing from the scope of the appended claims. Table 1 illustrates the light settings 202, 204, 206, 208 and the corresponding light setting rules, which will be used in the below-mentioned examples:

TABLE 1

|  | Light setting 202 | Light setting 204 | Light setting 206 | Light setting 208 |
| --- | --- | --- | --- | --- |
| Color scheme | Green | Multicolour | Red-Orange | White only |
| Dimming | No | Yes | Yes | Yes |
| Dynamic light | Static | Disco | Gradual change | Static |
| Input(s) | On/off | On/off Dim Speed | On/off, Dim Speed | On/off Dim White balance |
| Output(s) | Colour lamp | Colour lamp | Colour lamp | White lamp |

In a first example, the first device is a light switch 210 comprising two switch buttons 212, 214. The communication unit 104 of the configuration system communicates with the light switch 210 to receive its device properties. In this example, the device properties are defined by the two switch buttons 212, 214, which are both arranged for providing an output signal which is either 'On' or 'Off'. Based on these device properties, the processor 106 of the configuration system 200 may determine that switch button 212 is compliant with the light setting rules of light setting 202, because light setting 202 is a static, non-dimmable light setting that turns lights associated with this light setting to green. Therefore, the processor may associate switch button 212 with the on/off light setting rule of light setting 202. Alternatively, the processor 106 may determine that the on/off property of switch button 212 is compliant with the on/off light setting rule of light setting 204. Therefore, the processor 106 may determine to associate switch button 212 with light setting 204. Similar reasoning is applicable for associating switch button 212 with the on/off light setting rules of light settings 206 and 208. The processor 106 may determine that switch button 214 is, similar to switch button 212, compliant with the on/off light setting rules of light settings 202, 204, 206, 208. This example illustrates that it may occur that a device property is compliant with a plurality of light setting rules, whereupon the processor 106 may determine to associate a device property with a light setting that has the most compliant light setting rules. This may result in that the processor 106 associates switch button 212 with the on/off light setting rule of light setting 202 and switch button 214 with the on/off light setting rule of light setting 208. This example illustrates that it may be desired that the processor 106 has access to further indicators to create the association(s). Examples of such indicators are discussed below in this disclosure.

In a second example, the first device is a light switch 220 comprising three buttons 222, 224, 226 and a rotary switch 228. The communication unit 104 of the configuration system 200 communicates with the light switch 220 to receive its device properties. In this example, the device properties are defined by the three buttons 222, 224, 226, which are arranged for providing an output signal which may turn a light setting on or off, or may overrule a current light setting (e.g. pressing button 222 may activate a first light setting, and upon pressing button 224 a second light setting may overrule the first light setting). A further device property is defined by the rotary switch 228, which is arranged for providing an output signal with a value dependent on the rotation angle (e.g. a value between 0 and 100). Based on these device properties, the processor 106 of the configuration system 200 may determine that button 222 is compliant with the on/off light setting rule of light setting 202, because light setting 202 requires an 'on' input. Similar reasoning is applicable for associating buttons 224 and 226 with the on/off light setting rules of light settings 204, 206 and/or 208. The processor 106 may determine to associate the rotary switch 228 with the dimmer input light setting rule of any one of the light settings 204, 206 or 208. Alternatively, the processor 106 may determine to associate the rotary switch 228 with the dim input light setting rule of each of the light settings 204, 206 and 208, which may result in that the rotary switch may control the dim level of any one of the light settings 204, 206, 208 activated by the buttons 222, 224, 226. Alternatively, the processor 106 may determine to associate the rotary switch 228 with the speed light setting rule of light settings 204 and/or 206, resulting in that rotating the rotary switch will effectuate the speed of color change of the light setting 204 and/or 206.

In a third example, the first device is a presence sensor 230 (e.g. a PIR sensor). The communication unit 104 of the configuration system 200 communicates with the presence sensor 230 to receive its device properties. In this example, the device property is defined by the detection of no persons, a single person and, optionally, a plurality of persons. The processor 106 may determine to associate the presence detector 230 with any one of the on/off light setting rules of light settings 202, 204, 206 and/or 208 in order to effectuate that light setting upon detecting a person. Alternatively, the processor 106 may determine to associate the presence detector 230 with the dim input light setting rule of light setting 206 to use the number of people detected by the presence detector 230 as an input for the dimming level (and/or the color richness) of light setting 206.

In a fourth example, the first device is an LED lamp 240 that comprises a plurality of light sources arranged for emitting RGBW (red, green, blue, white) light. The communication unit 104 of the configuration system 200 communicates with the LED lamp 240 to receive its device properties. In this example, the device property is defined by the light emission properties and the dimming capabilities of the LED lamp 240. The LED lamp 240 is dimmable and arranged for emitting both white light and coloured light. Therefore, the processor 106 may associate the LED lamp 240 with any one of, or a plurality of, the output light setting rules of light settings 202, 204, 206, 208.

In a fifth example, the first device is an LED strip 250 that comprises a plurality of light sources arranged for emitting RGB light. The communication unit 104 of the configuration system 200 communicates with the LED strip 250 to receive its device properties. In this example, the device property is defined by the light emission properties and the dimming capabilities of the LED strip 250. The LED strip 250 is not dimmable and arranged for emitting coloured light. Therefore, the processor 106 may associate the color output of the LED strip 250 with the output light setting rules of light settings 202, 204, 206 and not with the output light setting rule of light setting 208, because light setting 208 requires a white light output.

In a sixth example, the first device is a white LED lamp 260 that is arranged for emitting white light. The communication unit 104 of the configuration system 200 communicates with the white LED lamp 260 to receive its device properties. In this example, the device property is defined by the light emission properties and the dimming capabilities of the white LED lamp 260. The processor may associate the white light output of the white LED lamp 260 with the output light setting rule of light setting 208, because this light setting 208 requires a white light output.

The above-mentioned examples illustrate that it may occur that a device property is compliant with a plurality of light setting rules. Therefore, it may be desirable if the processor has access to further indicators that may further influence the decision with which light setting a specific first device is associated.

An indicator that may further influence the decision with which light setting a specific first device is associated may be the presence of a second device already connected to the lighting system, the second device (not shown) being already associated with a light setting. The processor 106 may be further arranged for associating the device property of the first device 130 with a light setting rule based on the presence and/or the settings of this second device. If, for example, the first device (e.g. a first light switch) has the same functionality/device properties as the second device (e.g. a second light switch), the processor may determine to associate the device properties of the first device with a light setting rule of a light setting different from the light setting already associated with the second device.

Additionally or alternatively, the configuration system 100 may further comprise a proximity detector arranged for detecting a proximity of the first device 130, and the processor 106 may be further arranged for associating the device property 132 with the at least one light setting rule 112 further based on the detected proximity. The proximity information is used to associate a device property 132 of the first device 130 with a light setting rule 112 of a light setting 110 if the device property 130 and the light setting rule 112 are compliant, and if the first device 130 is, for example, within a predetermined proximity of the proximity detector. Various proximity detection methods that are known in the art may be used. The proximity may be detected based on, for example, the received signal strength (RSS) of a signal received from the first device 130, via near field communication (NFC) between the first device 130 and the detector, via location data from an (indoor) positioning system or any other type of proximity detection system.

Alternatively, the configuration system 100 may further comprise a location detector arranged for detecting a location of the first device 130, and the processor is further arranged for associating the device property 132 with the at least one light setting rule 112 further based on the detected location. The location of the first device and/or the further device may be, for example, detected by a positioning system, a global positioning system, a beacon-based positioning system, etc. The location of the first device 130 may be relative to the location detector, allowing the configuration system 100 to determine the association between a device property 132 and a light setting rule 112 based on the location of the first device 130. If the first device is located in, for example, the kitchen, the processor may determine to associate a device property of the first device with a light setting rule of a 'kitchen' light setting, while if the first device is located in an office, the processor 106 may determine to associate the device property 132 of the first device 130 with a light setting rule of a functional light setting. Alternatively, the processor 106 may determine the location of the first device 130 relative to a further device that is connected to the lighting system. This allows the processor 106 to associate the device property 132 of the first device 130 with a specific light setting rule 112 of a light setting 110 based on the location of the first device 130 and the further device. For example, if the first device 130 (e.g. a lighting control panel) and the further device (e.g. a lamp) are both located in the same part of the living room, the processor 106 may associate the device property 132 of the first device 130 with a light setting rule 112 of a light setting 110 that is already associated with the second device, if the device property of the first device 130 is compliant with the light setting rule 112 of the light setting 110.

Figure 3:
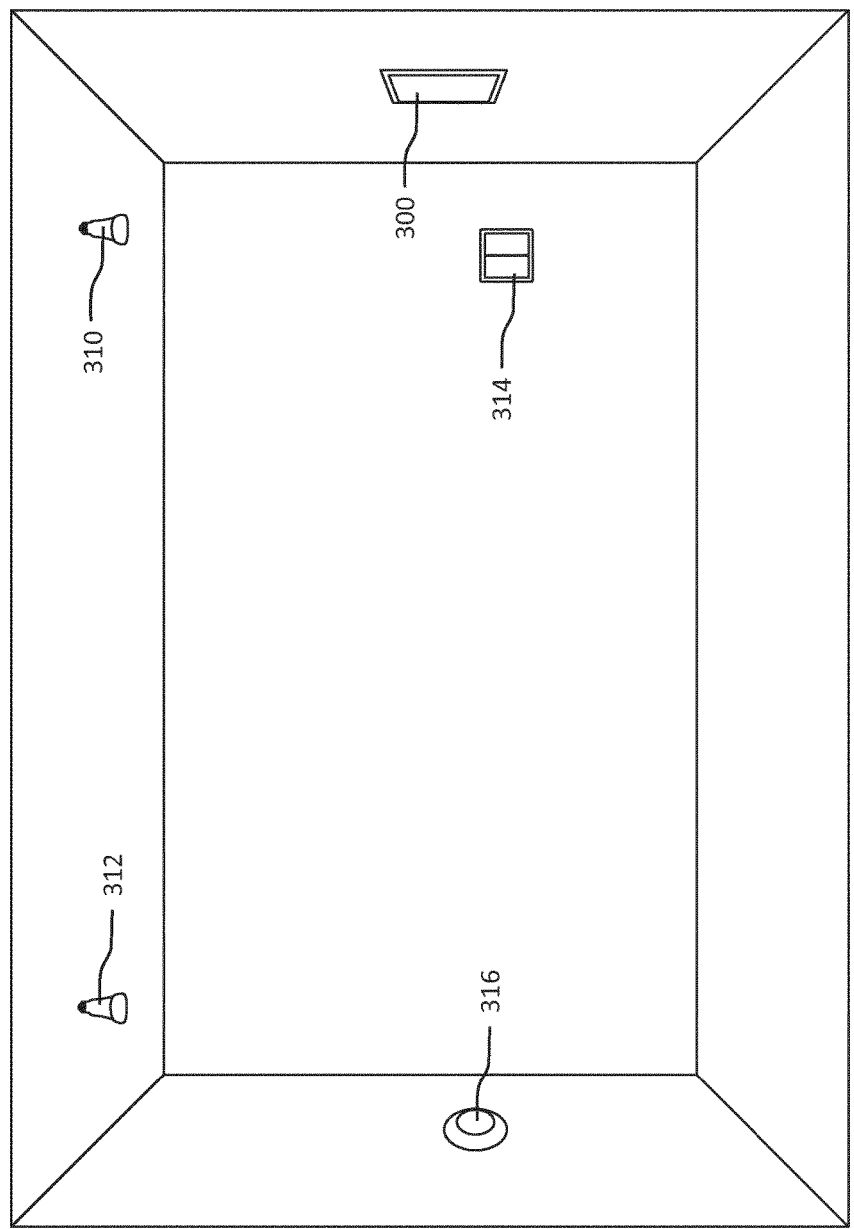
FIG. 3 shows schematically an embodiment of a room comprising a configuration system according to the invention for configuring first devices, wherein the configuration is based on the location of the first devices and/or the location of another first device.

FIG. 3 shows schematically an embodiment of a room comprising a configuration system 300 according to the invention for configuring first devices 310, 312, 314, 316, wherein the configuration is further based on the location of the first devices 310, 312, 314, 316 and/or the location of another first device 310, 312, 314, 316. In the embodiment of FIG. 3, lamps 310 and 312 may already be installed in the room and be both associated to a light setting rule of a first light setting (all lamps to white) and to a light setting rule of a second light setting (all lamps to green) by the configuration system 300. Lamp 312 is further associated with a light setting rule of a third light setting (lamp 312 to orange). Upon installing switch 314, which comprises two buttons, the configuration system 300 may determine to associate a first button to a light setting rule of the first light setting and a second button to a light setting rule of the second light setting, whereafter the light settings may be effectuated upon pressing the buttons. Upon installing rotary switch 316, which comprises a button and a rotary disc, the configuration system 300 may determine to associate the button with a light setting rule of the third light setting because the detector has detected, based on proximity or location information, that lamp 312 and rotary switch 316 are in each other's vicinity. This allows a user to apply the third light setting to lamp 312 by pressing the button of the rotary switch 320 and, optionally, to overrule the first or the second light setting with the third light setting. The configuration system 300 may further determine to assign the rotary disc to light setting rules of the first, second and third light setting, allowing the user to adjust the dim level of each (turned on) lamp.

The memory 102 of the configuration system 100 may be further arranged for accessing a usage history of one or more light settings. The processor 106 may be further arranged for accessing the usage history of the one or more light settings, and for associating the device property with the at least one light setting rule further based on the usage history of the one or more light settings. If a light setting is selected more often by a user, it may be more likely that the processor 106 associates a device property of the first device with a light setting rule of that light setting, while if a stored light setting is rarely used by a user, the processor 106 may determine to exclude that light setting from association.

Additionally or alternatively, a priority may be assigned to one or more light settings and/or one or more light setting rules. The processor 106 may be further arranged for accessing the priority level of the one or more light settings, and for associating the device property with the at least one light setting rule further based on the priority level of the one or more light settings and/or the one or more light setting rules. The priority may be determined by a user or by the configuration system, it may be based on a usage history, default settings, user preferences, etc.

In an embodiment, the configuration system may comprise a user interface arranged for receiving a user input. The user interface may for example comprise a touch-sensitive device such as a touchpad or a touchscreen, an audio sensor such as a microphone, a motion sensor and/or one or more buttons for receiving the user input. A user may provide user input to adjust the association(s) made by the processor, allowing the user to overrule the association(s) made by the processor. The user interface may be further arranged for receiving a user input related to the creation of light settings and to provide preference settings (e.g. color preferences, dynamic effect preferences, favorite light settings, etc.). This may allow the processor to further determine the associations between device properties and light setting rules based on the user preferences.

Figure 4:
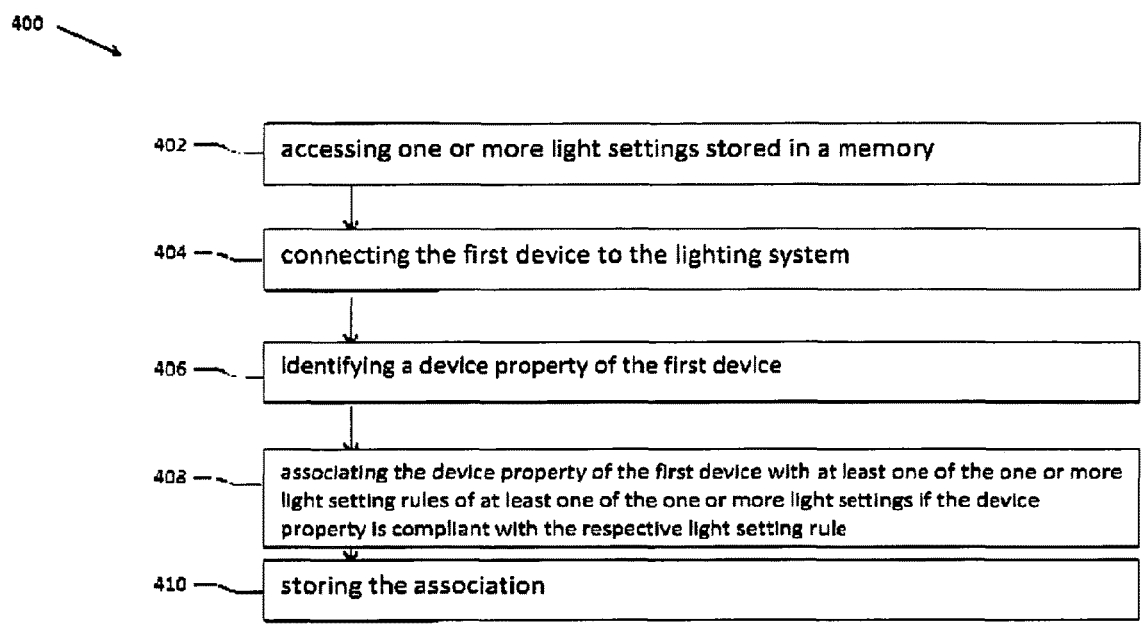
FIG. 4 shows schematically and exemplary a method for configuring a first device in a lighting system.

FIG. 4 shows schematically and exemplary a method 400 for configuring a first device 130 in a lighting system 100. The method 400 comprises the steps of:

accessing 402 one or more light settings 110 stored in a memory 102, which light settings 110 are defined by one or more light setting rules 112, connecting 404 the first device 130 to the lighting system 100, identifying 406 a device property 132 of the first device 130, associating 408 the device property 132 of the first device 130 with at least one of the one or more light setting rules 112 of at least one of the one or more light settings 110 if the device property 132 is compliant with the respective light setting rule 112, thereby associating the first device 130 with the light setting 110, and storing 410 the association.

It should be noted that the above-mentioned embodiments illustrate rather than limit the invention, and that those skilled in the art will be able to design many alternative embodiments without departing from the scope of the appended claims.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer or processing unit. In the device claim enumerating several means, several of these means may be embodied by one and the same item of hardware.

The mere fact that certain measures are recited in mutually different dependent claims does not indicate that a combination of these measures cannot be used to advantage.

The invention claimed is:

1. A method for configuring a first device in a lighting system, the method comprising the steps of:
   accessing one or more light settings stored in a memory, which light settings are defined by one or more light setting rules, wherein the one or more light setting rules are descriptive of properties of respective light settings,
   connecting the first device to the lighting system,
   identifying a device property of the first device, wherein the device property Is descriptive of the type of control signals the first device can generate and/or receive;
   determining if the device property of the first device is compliant with at least one of the one or more light setting rules of at least one of the one or more light settings, and if so associating the first device with the one or more light settings, and
   storing the association.

2. The method of claim 1, wherein the first device is a lighting device arranged for emitting light, and wherein the device property is defined by a type of the lighting device.

3. The method of claim 1, wherein the first device is a control device for controlling the lighting system in dependence of an input, which control device comprises an input element arranged for receiving the input, and wherein the device property is defined by a type of the input element.

4. The method of claim 1, wherein the lighting system comprises a second device which is associated with a first light setting, and wherein the association between the device property of the first device and the at least one light setting rule is further based on the association between the first light setting and the second device.

5. The method of claim 4 further comprising the step of detecting a proximity between the first device and the second device, wherein the association of the device property of the first device with the at least one of the one or more light setting rules is further based on the proximity.

6. The method of claim 4 further comprising the step of receiving a first indication of a first location of the first device and a second indication of a second location of the second device, wherein the association of the device property with the at least one of the one or more light setting rules is further based on the locations of the first device and the second device.

7. The method of claim 1 further comprising the step of accessing a usage history of the one or more light settings, wherein the association of the device property with the at least one of the one or more light setting rules is further based on the usage history of the one or more light settings.

8. The method of claim 1 further comprising the step of assigning a priority to one or more light settings and/or one or more light setting rules, wherein the association of the device property with the at least one of the one or more light setting rules is further based on the priority of the one or more light settings and/or the one or more light setting rules.

9. A computer-readable, non-transitory medium having stored therein instructions for causing a processing unit to execute a method for configuring a first device in a lighting system, the medium comprising code for:
   accessing one or more light settings stored in a memory, which light palings are defined by one or more light setting rules, wherein the one or more light setting rules are descriptive of properties of respective light settings,
   connecting the first device to the lighting system,
   identifying a device property of the first device, wherein the device property is descriptive of the type of control signals the first device can generate and/or receive;
   determining if the device property of the first device Is compliant with at least one of the one or more light setting rules of at least one of the one or more light settings, and if so associating the first device with the one or more light settings, and
   storing the association.

10. A configuration system for configuring a first device in a lighting system, the configuration system comprising:
    a memory arranged for storing one or more light settings, which light settings are defined by one or more light setting rules, wherein the one or more light setting rules are descriptive of properties of respective light settings,
    a communication unit arranged for communicating with the first device for receiving information about a device property of the first device, wherein the device property is descriptive of the type of control signals the first device can generate and/or receive; and
    a processor coupled to the communication unit arranged for identifying the device property of the first device, and for accessing one or more light settings stored in the memory, and for determining if the device property is compliant with at least one of the one or more light setting rules of at least one of the one or more light settings, if so associating the first device with the one or more light settings, and for storing the association.

11. The configuration system of claim 10, wherein the memory is further arranged for storing a usage history of one or more light settings, and wherein the processor is further arranged for accessing the usage history of the one or more light settings, and for associating the device property with the at least one of the one or more light setting rules further based on the usage history of the one or more light settings.

12. The configuration system of claim 10, wherein the configuration system further comprises a proximity detector arranged for detecting a proximity of the first device, and wherein the processor is further arranged for associating the device property with the at least one of the one or more light setting rules if the first device is within a predetermined proximity of the proximity detector.

13. The configuration system of claim 10, wherein the configuration system further comprises a location detector arranged for detecting a location of the first device, and wherein the processor is further arranged for associating the device property with the at least one of the one or more light setting rules further based on the detected location.

14. The configuration system of claim 10, wherein the processor is further arranged for determining if the first device is arranged for generating control signals or for receiving control signals based on the device property, and for associating the device property with the at least one of the one or more light setting rules further based on this determination.

15. The configuration system of claim 10, wherein the memory, the communication unit and the processor are co-located in one device.

* * * * *